US012530409B2

(12) United States Patent
Marrotte

(10) Patent No.: US 12,530,409 B2
(45) Date of Patent: Jan. 20, 2026

(54) RANDOM BLOB GENERATION

(71) Applicant: Dell Products L.P., Round Rock, TX (US)

(72) Inventor: Michael Marrotte, Windermere, FL (US)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 18/316,891

(22) Filed: May 12, 2023

(65) Prior Publication Data

US 2024/0378246 A1 Nov. 14, 2024

(51) Int. Cl.
*G06F 16/906* (2019.01)
*G06F 9/52* (2006.01)

(52) U.S. Cl.
CPC ............ *G06F 16/906* (2019.01); *G06F 9/526* (2013.01)

(58) Field of Classification Search
CPC ................................ G06F 16/906; G06F 9/526
See application file for complete search history.

(56) References Cited

U.S. PATENT DOCUMENTS

| 2010/0106695 A1* | 4/2010 | Calder | G06F 16/2255 707/696 |
| 2011/0099347 A1* | 4/2011 | Plasek | G06F 12/023 711/170 |
| 2013/0339315 A1* | 12/2013 | Stoakes | G06F 3/0683 707/E17.005 |

* cited by examiner

*Primary Examiner* — Maher N Algibhah
(74) *Attorney, Agent, or Firm* — Amin, Turocy & Watson, LLP

(57) ABSTRACT

A system can read, by a first reader component, a first sub-sequence of a sequence of random computer data starting at a first offset position of the sequence of random computer data. The system can read, by a second reader component, a second sub-sequence of the sequence of random computer data starting at a second offset position of the sequence of random computer data, wherein the first offset position differs from the second offset position. The system can store the first sub-sequence as a first binary large object. The system can store the second sub-sequence as a second binary large object.

20 Claims, 11 Drawing Sheets

600 ↘

(602)

↓

READING, BY A FIRST READER COMPONENT, A FIRST SUB-SEQUENCE OF A SEQUENCE OF RANDOM COMPUTER DATA STARTING AT A FIRST OFFSET POSITION OF THE SEQUENCE OF RANDOM COMPUTER DATA 604

↓

READING, BY A SECOND READER COMPONENT, A SECOND SUB-SEQUENCE OF THE SEQUENCE OF RANDOM COMPUTER DATA STARTING AT A SECOND OFFSET POSITION OF THE SEQUENCE OF RANDOM COMPUTER DATA, WHEREIN THE FIRST OFFSET POSITION DIFFERS FROM THE SECOND OFFSET POSITION 606

↓

STORING THE FIRST SUB-SEQUENCE AS A FIRST BINARY LARGE OBJECT 608

↓

STORING THE SECOND SUB-SEQUENCE AS A SECOND BINARY LARGE OBJECT 610

GENERATING, BY A GENERATOR COMPONENT, A FIRST SEQUENCE OF
RANDOM COMPUTER DATA 804

↓

GENERATING, BY THE GENERATOR COMPONENT, A SECOND SEQUENCE OF RANDOM COMPUTER
DATA, WHEREIN THE FIRST READER COMPONENT AND THE SECOND READER COMPONENT ARE
CONFIGURED TO READ SUB-SEQUENCES FROM THE SECOND SEQUENCE OF RANDOM COMPUTER
DATA 806

↓

808

900

(902)

↓

READING, BY A FIRST READER, A FIRST SUB-SEQUENCE OF A SEQUENCE OF RANDOM COMPUTER DATA STARTING AT A FIRST OFFSET POSITION OF THE SEQUENCE 904

↓

READING, BY A SECOND READER, A SECOND SUB-SEQUENCE OF THE SEQUENCE STARTING AT A SECOND OFFSET POSITION OF THE SEQUENCE, WHEREIN THE FIRST OFFSET POSITION DIFFERS FROM THE SECOND OFFSET POSITION 906

↓

STORING THE FIRST SUB-SEQUENCE AS A FIRST BINARY LARGE OBJECT 908

↓

STORING THE SECOND SUB-SEQUENCE AS A SECOND BINARY LARGE OBJECT 910

RANDOM BLOB GENERATION

BACKGROUND

Random computer data can be generated for purposes such as testing a computer storage system.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can read, by a first reader component, a first sub-sequence of a sequence of random computer data starting at a first offset position of the sequence of random computer data. The system can read, by a second reader component, a second sub-sequence of the sequence of random computer data starting at a second offset position of the sequence of random computer data, wherein the first offset position differs from the second offset position. The system can store the first sub-sequence as a first binary large object. The system can store the second sub-sequence as a second binary large object.

An example method can comprise reading, by a first reader of a system comprising a processor, a first sub-sequence of a sequence of random computer data starting at a first offset position of the sequence. The method can further comprise reading, by a second reader of the system, a second sub-sequence of the sequence starting at a second offset position of the sequence, wherein the first offset position differs from the second offset position. The system can further comprise storing, by the system, the first sub-sequence as a first binary large object. The system can further comprise storing, by the system, the second sub-sequence as a second binary large object.

An example non-transitory computer-readable medium can comprise instructions that, in response to execution, cause a system comprising a processor to perform operations. These operations can comprise reading, by a first reader, a first sub-sequence of a sequence of random computer data starting at a first offset position of the sequence. These operations can further comprise reading, by a second reader, a second sub-sequence of the sequence starting at a second offset position of the sequence, wherein the first offset position differs from the second offset position. These operations can further comprise storing the first sub-sequence as first computer data. These operations can further comprise storing the second sub-sequence as second computer data.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow that can facilitate random blob generation, in accordance with an embodiment of this disclosure;

FIG. 9 illustrates another example process flow that can facilitate random blob generation, in accordance with an embodiment of this disclosure;

DETAILED DESCRIPTION

Overview

Figure 1:
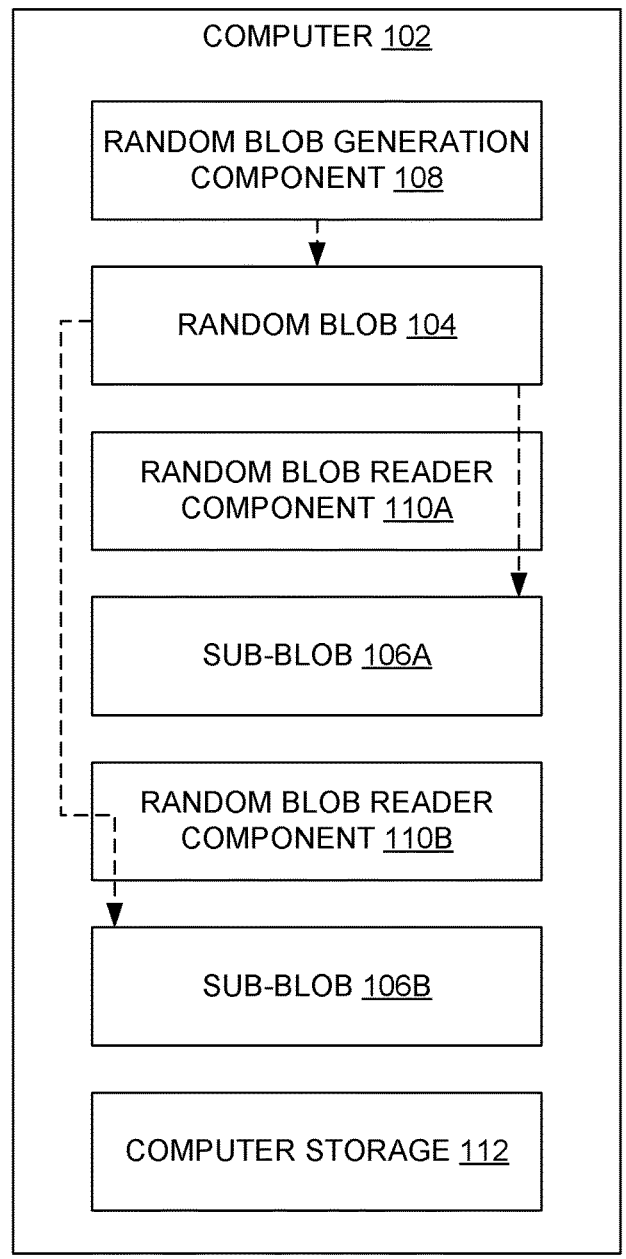
FIG. 1 illustrates an example system architecture that can facilitate random blob generation, in accordance with an embodiment of this disclosure.

Generating a random blob (binary large object, which can comprise computer data stored as one data structure or entity, like an image or video file) can be processor bound, where the speed of the task is limited by the speed of the processor(s) of a computer system that is performing the task. As such, generating a random blob can be performed orders of magnitude slower than a corresponding network interface could transmit the blob. This can create a bottleneck when using a general purpose computer to serve a random blob. An example where a general purpose computer can serve a random blob can involve generating traffic—e.g., load testing object storage services in a client-server model over a network. The present techniques can be implemented to generate a random blob several orders of magnitude faster than prior approaches, which can be applied to such scenarios.

The present techniques can involve reusing random multi-reader blobs by randomly accessing sub-blobs that are randomly refreshed. The input parameters can be: max-blob (which can indicate a maximum blob size to be generated), min-blob (which can indicate a minimum blob size to be generated), max-sub-blob (which can indicate a maximum sub-blob size to be generated), min-sub-blob (which can indicate a minimum sub-blob size to be generated), max-refresh (which can indicate a maximum amount of time between replacing blobs that readers operate on), min-refresh (which can indicate a minimum amount of time between replacing blobs that readers operate on), where the max-sub-blob could be less than min-blob, but not necessarily.

A multi-reader random blob can be generated at random time intervals between min-refresh and max-refresh, and randomly sized between min-blob and max-blob. Readers can create random sub-blobs by randomly reading the current blob starting at random offsets and stopping randomly between min-sub-blob and max-sub-blob.

A list or queue data structure of blobs can be maintained that readers can work on in a first-in-first-out fashion. This data structure can be referred to herein as a shared list. That is, in some examples, when a reader completes creating a sub-blob, and there's a new blob in the queue, the reader can continue with the blob it just read from, or move to the newer blob (in either case, the reader can read a new sub-blob with a new set of parameters, like offset).

The blob can be accessed as a bit-ring (a logically circular string of zeroes and ones) using modulo arithmetic (where there is a highest value that will be returned) such that readers never see the end of blob. That is, when a reader attempts to read past the end of a blob, the bit-ring structure will direct the reader back to the start of the blob. In that manner, a blob will have no end from the perspective of a reader.

Prior approaches to random blob generation can involve entities using traffic generators comprising highly-specialized hardware, and which can be substantially more expensive to own and operate. Other prior approaches can include streaming random bits (e.g., /dev/random), but can handle only small loads.

In the present techniques, it can be that not only are random blocks read from random data, but that random data is refreshed at random times. Additionally, data according to the present techniques can be structured as a "bitring" (sometimes referred to as a bit-ring), where modulo arithmetic is used to provide a generator with a logical endless space in which to write data.

To reduce a chance of random blobs overlapping, a relatively large bitring size can be used, and a relatively high refresh rate can be used. Additionally, a number of readers can be relatively reduced. It can be that some scenarios require occasional or even frequent overlap, such as to mimic when a photo or video goes socially viral. In some examples, a bitring size, a refresh rate, and a number of readers can comprise tunable parameters. Tradeoffs in tuning these parameters can involve considerations such as an amount of computing resources available for random blob generation, and an amount of randomness desired in random blob generation.

Invoking computer-executable code that embodies the present techniques can cause a continuous stream of random binary digits (bits) to be generated and shared with multiple reader processes. The generated stream can be stored in a shared list (or other data structure or location accessible to both a generator and readers), and a reader process can read random sub-blobs of bits from the shared list. In some examples, each sub-blob can have a size between a minimum and maximum value, which can be specified based on user input data. A reader (of multiple readers) can store sub-blobs that it reads, such as by streaming the sub-blobs to a random blob consumer, like a storage endpoint that is being tested. In some examples, a reader can post data to a storage endpoint of a computer storage system for load testing.

The file can have parameters that are customized based on user input data. These parameters can include a minimum and maximum size of a generated binary blob, an amount of time the generator should wait between generating two blobs, a number of reader processes, a time each reader process should wait between reading sub-blobs, and a minimum and maximum size of sub-blobs the readers should read.

In some examples, the present techniques can be implemented according to a Python programming language.

An example program can utilize Python's multiprocessing module to create multiple processes that run in parallel. One process can generate the random bits and adds them to the shared list (shared_blob), while multiple other processes can read sub-blobs from the shared list. The multiprocessing module can provide a way to share data between processes in a safe way, and to synchronize the processes to avoid race conditions or deadlocks.

To ensure that the readers can access the shared list safely, the program can use a mutual exclusion lock provided by the multiprocessing module. This lock can be implemented to ensure that only one process can modify the shared list at a time, which can prevent conflicts between generator and reader processes.

The program can use modulo arithmetic to ensure that the sub-blobs read by the readers are circular, which can mean that if a sub-blob goes beyond the end of the binary blob, it wraps around to the beginning—that is, a bitring as described herein. This can ensure that the readers always get valid sub-blobs and that no bits are lost.

The approach of generating random blobs and adding them to a shared list can permit reader processes to access the same blob concurrently, rather than waiting for the next blob to be generated. This can mean that the reader processes can start processing the blob as soon as it is available, without having to wait for the generator process to produce the next one.

In some examples, in a steady stream of random blobs, the reader processes could have to wait for the next blob to be generated before they could start processing it, which could result in idle time for the reader processes and overall slower processing. With a shared list approach, the reader processes can keep processing blobs as they become available, potentially resulting in faster processing overall.

In some examples, random blob generation can be implemented in computer-executable code as follows:
1. Parse command line arguments using argparse, which can specify a minimum size and maximum size of the blob to generate, a wait time between generating blobs, a number of reader processes, a wait time between reading blobs, and minimum and maximum sizes of the sub-blob to read.
2. Create a multiprocessing manager object to hold a shared list.
3. Define a generate_random_blob function, which can take the shared list, minimum and maximum sizes of the blob, wait time between generating blobs, generate a random blob of bits of a random size between the minimum and maximum sizes, and add it to the shared list. If the time it takes to generate the blob is less than the wait time, the function can sleep for the remaining time. If there is more than one blob in the shared list, the first blob can be removed.
4. Define a read_random_blob function, which can take the shared list, process number, wait time between reading blobs, and minimum and maximum sizes of the sub-blob, read a sub-blob of random bits from the first blob value in the shared list, and print it to a console along with the reader process number. The function can generate a random start position between 1 and the length of the blob, and generate a random sub-blob size between the minimum and maximum sub-blob sizes. The function can read the sub-blob by iterating over the indices of the sub-blob, and using modulo arithmetic to wrap around to the beginning of the blob if the end of the blob is reached.

5. Create a generator process to generate random blobs and add them to the shared list using the generate_random_blob function.
6. Create reader processes to read the blobs from the shared list using the read_random_blob function. Create one reader process for each reader specified in the command line arguments.
7. Wait for the generator process to finish using the join method.
8. Once the generator process has finished, the reader processes can be terminated automatically.
9. The program ends.

The present techniques can be implemented to facilitate generating and using random data. It can be that random blocks are read from random data, and that that random data is randomly refreshed at random times.

The present techniques can be implemented to fine-tune an amount of overlap between data of blobs. To reduce a probability of overlap, a bitring with a relatively large circumference can be used. Additionally, a refresh rate can be increased, and/or the number of readers can be reduced. In some examples, more overlap can be desired, such as to model when a photo or video goes viral.

In some examples, a blob can be indexed in a cyclical fashion (e.g., as a bit-ring) so as not to attempt to access blob data past the end of a blob, and modulo/remainder arithmetic can be implemented using a bitwise AND operation (where two bits are compared, the output is 1 where both bits are 1, and the output is 0 otherwise), and the following:

i mod n is equivalent to i & (n−1) when n is a power of 2 where i is a counter/index and n is the length of the blob

A speed of a bitwise i & (n−1) operation can be small and fixed at O(1), where an amount of time taken to perform the operation does not grow with the n—the size of the blob—unlike a corresponding module operation that can grow as O(log n).

In some examples, indexing a blob in this manner can be implemented according to the present techniques, can be an optional function, where user input data determines whether it is implemented.

Example Architecture

FIG. 1 illustrates an example system architecture 100 that can facilitate random blob generation, in accordance with an embodiment of this disclosure. While the present examples generally relate to generating blob data types, it can be appreciated that they can be applied to generating other data types, such as files.

System architecture 100 comprises computer 102, random blob 104, sub-blob 106A, sub-blob 106B, random blob generation component 108, random blob reader component 110A, random blob reader component 110B, and computer storage 112.

Figure 11:
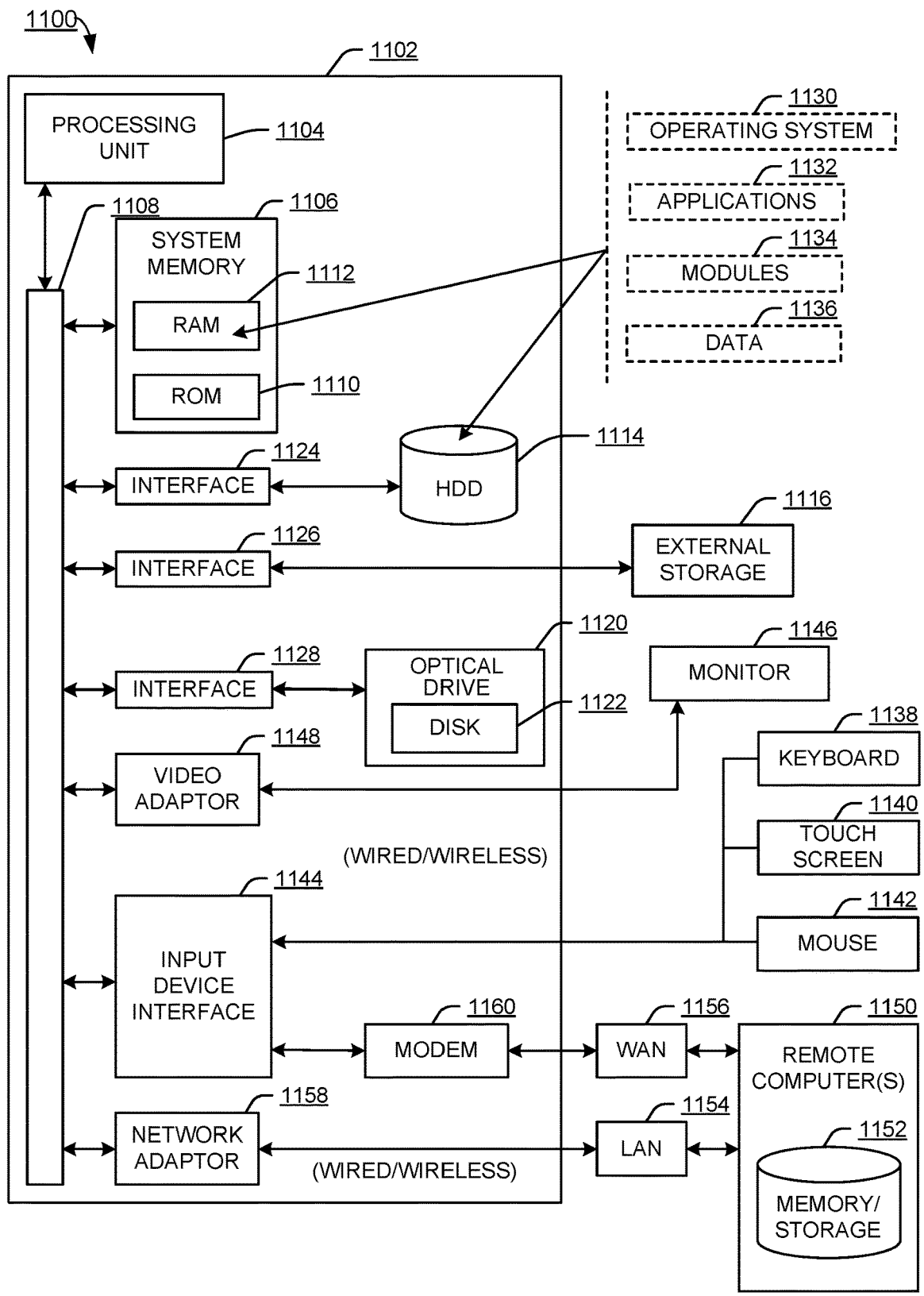
FIG. 11 illustrates an example block diagram of a computer operable to execute an embodiment of this disclosure.

Computer 102 can be implemented with part(s) of computing environment 1100 of FIG. 11.

Random blob generation component 108 can generate one or more random blobs of computer data, such as random blob 104, and make random blob 104 available to reader components, such as by storing random blob 104 in a shared list.

Each of random blob reader component 110A and random blob reader component 110B can read from random blob 104 (such as at randomized offset starting positions) to generate sub-blob 106A and sub-blob 106B, respectively.

In some examples, random blob reader component 110A and random blob reader component 110B can store these sub-blobs (sub-blob 106A and sub-blob 106B) in computer storage 112 to generate random data storage, such as for purpose of testing or validating a computer data storage system.

In some examples, computer 102 (such as with random blob generation component 108, random blob reader component 110A, and/or random blob reader component 110B) can implement part(s) of the process flows of FIGS. 6-10 to implement random blob generation.

It can be appreciated that system architecture 100 is one example system architecture for random blob generation, and that there can be other system architectures that facilitate random blob generation.

Figure 2:
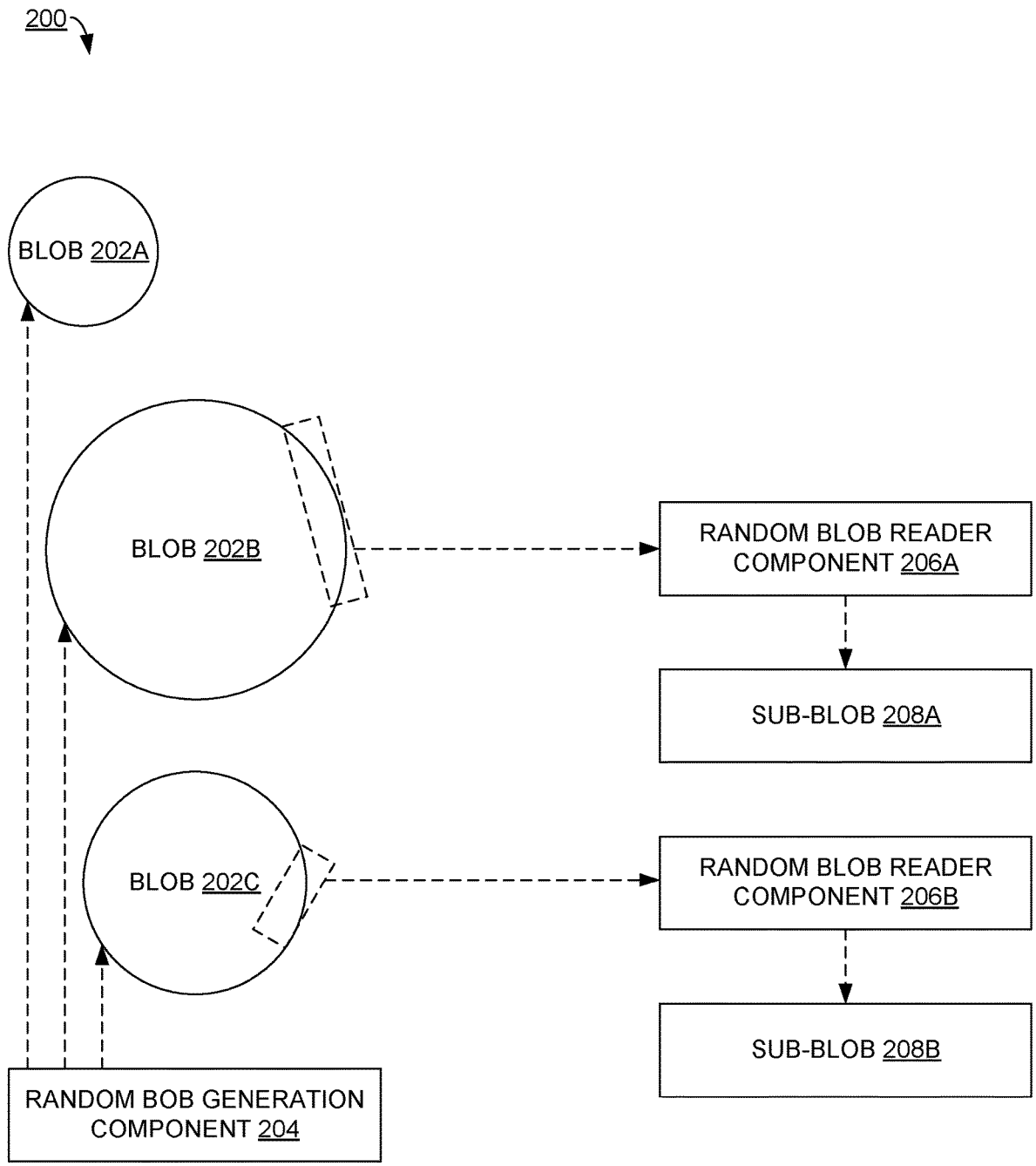
FIG. 2 illustrates another example system architecture that can facilitate random blob generation, in accordance with an embodiment of this disclosure.

FIG. 2 illustrates another example system architecture 200 that can facilitate random blob generation, in accordance with an embodiment of this disclosure. In some examples, part(s) of system architecture 200 can be implemented by part(s) of system architecture 100 of FIG. 1 to facilitate random blob generation.

System architecture 200 comprises blob 202A, blob 202B, blob 202C, random blob generation component 204, random blob reader component 206A, random blob reader component 206B, sub-blob 208A, and sub-blob 208B. In some examples, each of blob 202A, blob 202B, and blob 202C can be similar to random blob 104 of FIG. 1; random blob generation component 204 can be similar to random blob generation component 108; random blob reader component 206A and random blob reader component 206B can be similar to random blob reader component 110A and random blob reader component 110B, respectively; and sub-blob 208A and sub-blob 208B can be similar to sub-blob 106A and sub-blob 106B, respectively.

As illustrated in the example of FIG. 2, random blob generation component 204 can generate multiple random blobs, such as blob 202A, blob 202B, blob 202C. Then, random blob reader component 206A and random blob reader component 206B can read from one or more of these blobs (and can read from the same blob). As depicted, random blob reader component 206A reads from blob 202C to create sub-blob 208A, and random blob reader component 206B reads from blob 202B to create sub-blob 208B.

In some examples, readers read from a most-recently created blob. In the example of FIG. 2, it can be that blob 202C is the most-recently created blob (relative to blob 202A and blob 202B), and random blob reader component 206A has read from it. It can be that random blob reader component 206B read from blob 202B when blob 202C did not exist and blob 202B was the most recently-created blob.

As depicted, each of blob 202A, blob 202B, and blob 202C are a different size (e.g., 2 gigabytes (GB), 10 GB, and 5 GB, respectively), and there can be examples where one or more blobs are of the same size.

Example Process Flows

Figure 3:
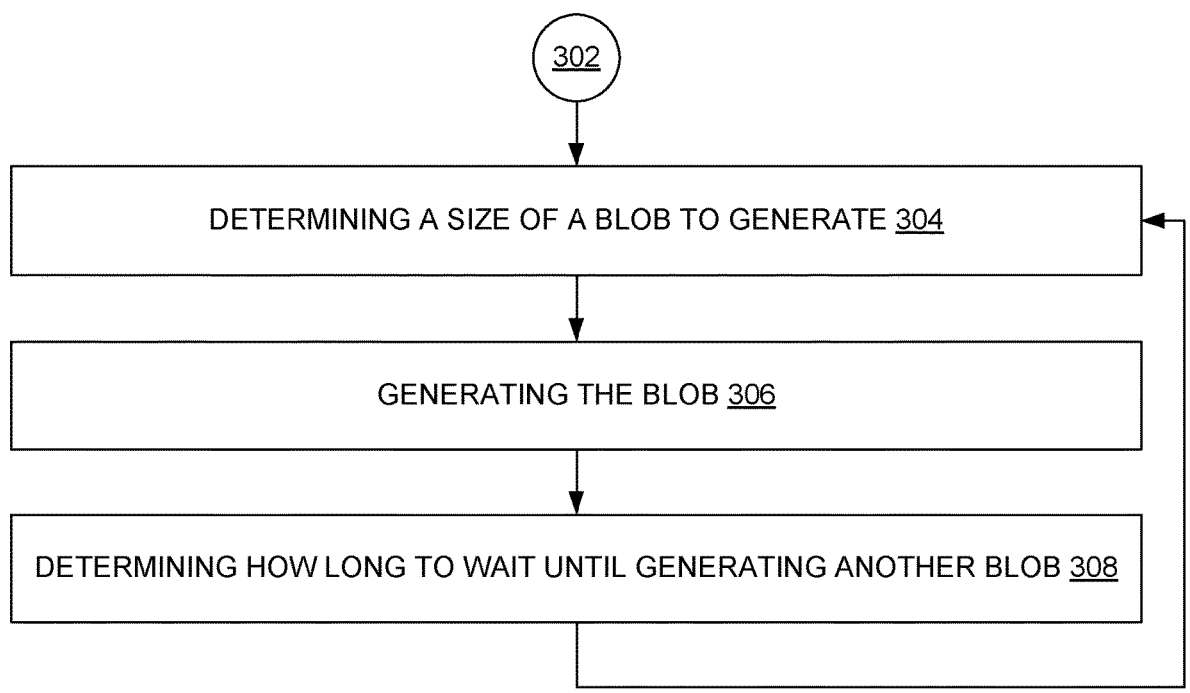
FIG. 3 illustrates an example process flow for a generator that can facilitate random blob generation, in accordance with an embodiment of this disclosure.

FIG. 3 illustrates an example process flow 300 for a generator that can facilitate random blob generation, in accordance with an embodiment of this disclosure. In some examples, one or more embodiments of process flow 300 can be implemented by random blob generation component 108 of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 300 begins with 302, and moves to operation 304.

Operation 304 depicts determining a size of a blob to generate. In some examples, this can be determined as a random size between parameters max-blob and min-blob.

After operation 304, process flow 300 moves to operation 306.

Operation 306 depicts generating the blob. This can comprise generating a blob of the size determined in operation 304. Where operation 306 is implemented by a generator that has already generated a blob, this can comprise the generator waiting a random amount of time between parameters max-refresh and min-refresh.

After operation 306, process flow 300 moves to operation 308.

Operation 308 depicts determining how long to wait until generating another blob. Similar to operation 304, this can comprise waiting a random amount of time between parameters max-refresh and min-refresh.

After operation 308, process flow 300 returns to operation 304 to generate another blob. In this manner multiple blobs of varying sizes can be generated, while waiting varying amount of times between generating blobs.

Figure 4:
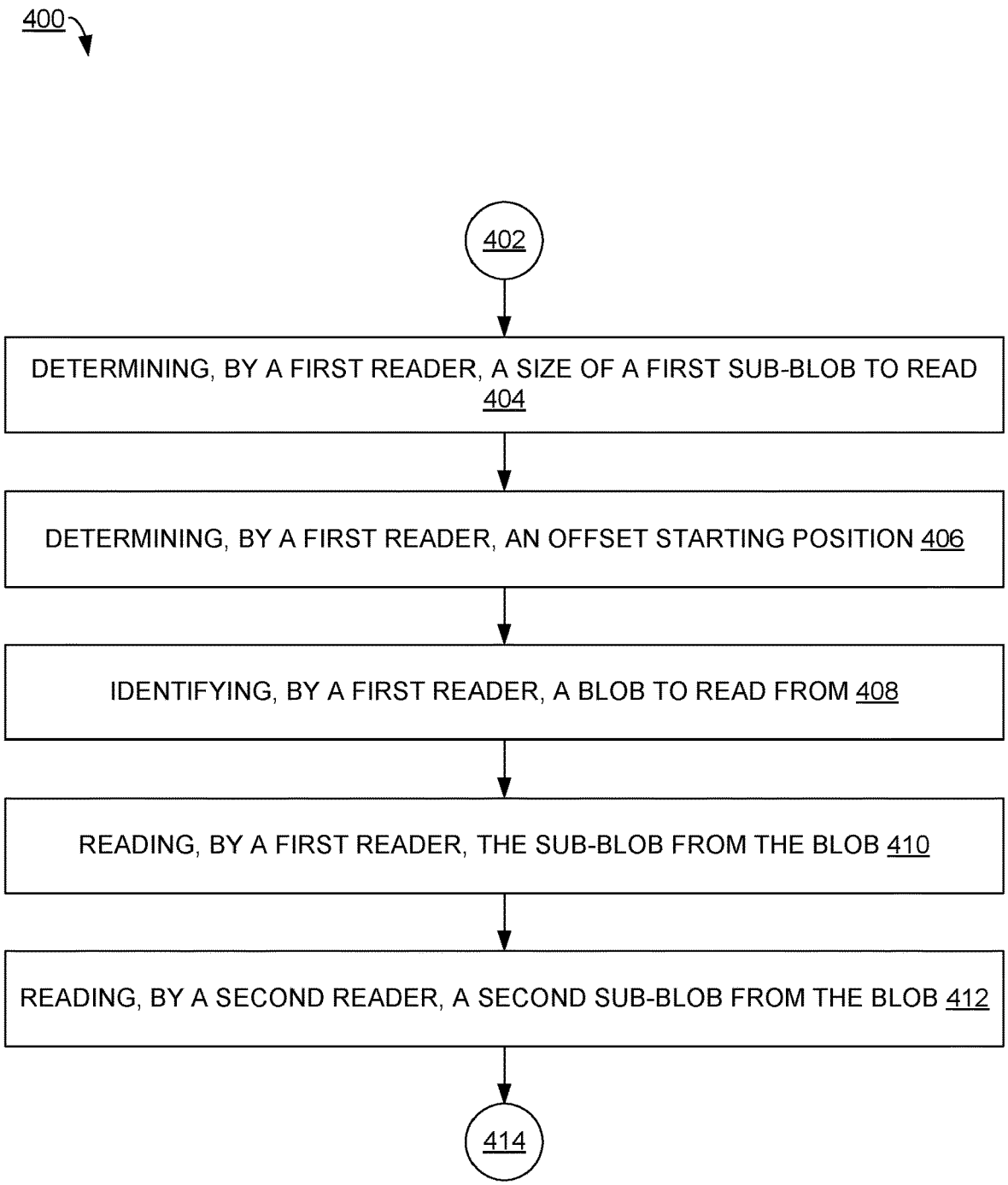
FIG. 4 illustrates an example process flow for multiple readers reading multiple sub-sequences from a sequence, that can facilitate random blob generation, in accordance with an embodiment of this disclosure.

FIG. 4 illustrates an example process flow 400 for multiple readers reading multiple sub-sequences from a sequence, that can facilitate random blob generation, in accordance with an embodiment of this disclosure. In some examples, one or more embodiments of process flow 400 can be implemented by random blob reader component 110A or random blob reader component 110B of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404.

Operation 404 depicts determining, by a first reader, a size of a first sub-blob to read. In some examples, this can be determined as a random size between parameters max-sub-blob and min-sub-blob.

After operation 404, process flow 400 moves to operation 406.

Operation 406 depicts determining, by the first reader, an offset starting position. This can comprise a random position within a blob to start reading from. In some examples, the offset value can be a random value between 0 and a size of the blob. In other examples, the offset value can be greater than the size of the blob, and modulo arithmetic can be used to convert that offset into a value that is no greater than the size of the blob.

After operation 406, process flow 400 moves to operation 408.

Operation 408 depicts identifying, by the first reader, a blob to read from. Where there are multiple blobs (such as in the example of FIG. 2), the blob to read from can be the most-recently generated, or current, blob.

After operation 408, process flow 400 moves to operation 410.

Operation 410 comprises reading, by the first reader, a sub-blob from the blob. This can be performed in a manner similar to the example of FIG. 1, where random blob reader component 110A reads sub-blob 106A from random blob 104. This reading can be performed based on the size of the first sub-blob to read in operation 404, and the offset starting position in operation 406.

After operation 410, process flow 400 moves to operation 412.

Operation 412 depicts reading, by a second reader, a second sub-blob from the blob. In some examples, operation 412 can be performed in a similar manner as operation 412, where there is a different reader in operation 412 (e.g., random blob reader component 110B of FIG. 1) than in operation 410 (e.g., random blob reader component 110A). In this manner, multiple readers can read sub-blobs from the same blob. Additionally, in a similar manner, one reader can read multiple sub-blobs from the same blob.

After operation 412, process flow 400 moves to 414, where process flow 400 ends.

Figure 5:
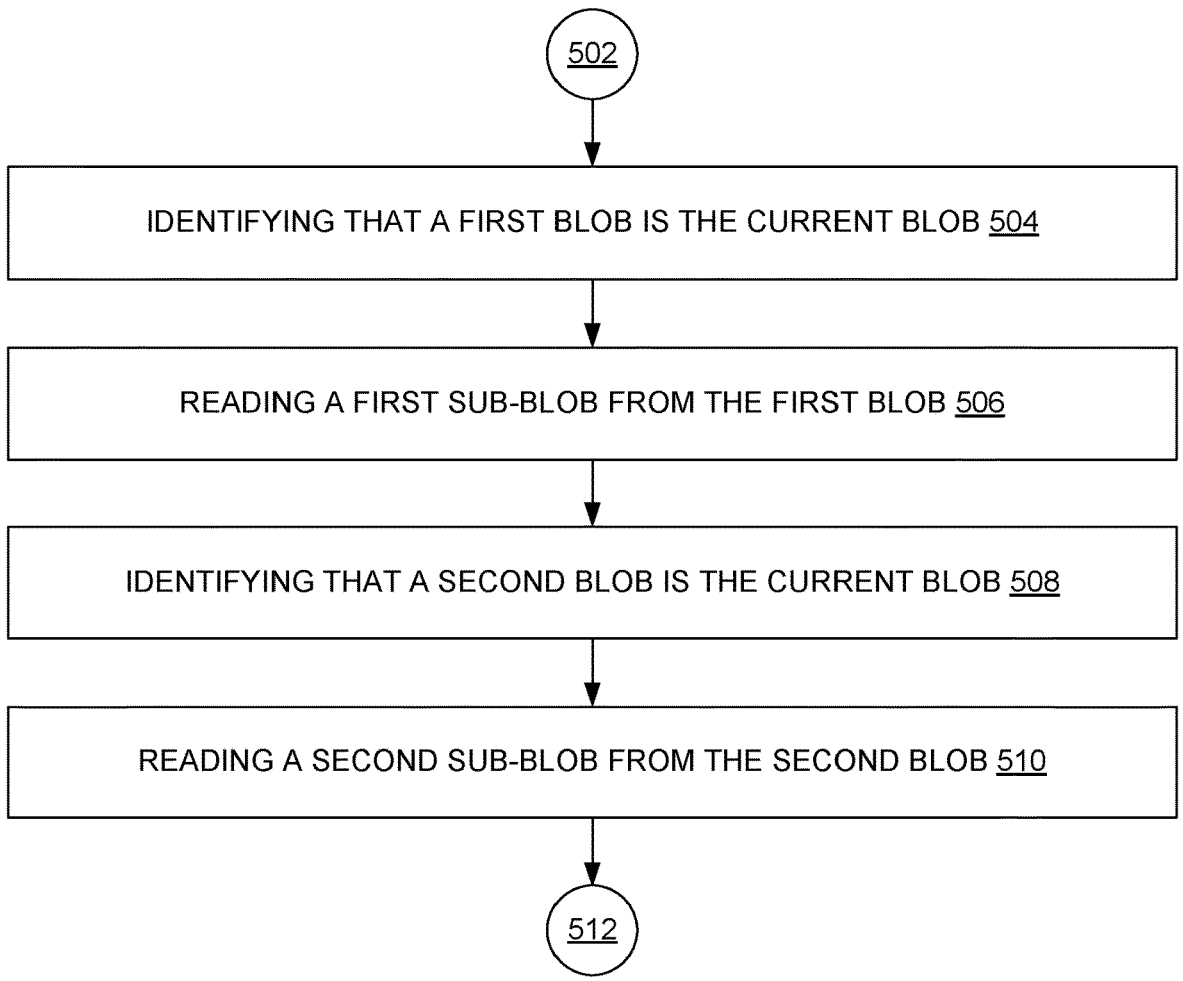
FIG. 5 illustrates an example process flow for a reader reading sub-sequences from multiple sequences, that can facilitate random blob generation, in accordance with an embodiment of this disclosure.

FIG. 5 illustrates an example process flow for a reader reading sub-sequences from multiple sequences, that can facilitate random blob generation, in accordance with an embodiment of this disclosure. In some examples, one or more embodiments of process flow 500 can be implemented by random blob reader component 110A or random blob reader component 110B of FIG. 1 random blob reader component 110A or random blob reader component 110B of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts identifying that a first blob is the current blob. Using the example of FIG. 2 where there are multiple blobs (blob 202A, blob 202B, and blob 202C), one blob can be the current blob, and can be marked as such, such as being stored in a shared list that is accessible by random blob reader component 206A and random blob reader component 206B. In such examples, identifying the current blob can comprise accessing the shared list for the blob stored within the shared list.

After operation 504, process flow 500 moves to operation 506.

Operation 506 depicts reading a first sub-blob from the first blob. Using the example of FIG. 1, this can comprise random blob reader component 110A reading sub-blob 106A from random blob 104.

After operation 506, process flow 500 moves to operation 508.

Operation 508 depicts identifying that a second blob is the current blob. The current blob can change over time, as new blobs are created by a generator component. In operation 508, the current blob has changed since operation 504. This can be identified such as by accessing a shared list in which the current blob is stored.

After operation 508, process flow 500 moves to operation 510.

Operation 510 depicts reading a second sub-blob from the second blob. In some examples, operation 510 can be performed in a similar manner as operation 506, though on a different current blob than in operation 506. In this manner, a reader component (or multiple reader components) can read sub-blobs from different blobs as different blobs are generated and become the current blob.

After operation 510, process flow 500 moves to 512, where process flow 500 ends.

FIG. 6 illustrates an example process flow that can facilitate random blob generation, in accordance with an embodiment of this disclosure. In some examples, one or more embodiments of process flow 600 can be implemented by random blob generation component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts reading, by a first reader component, a first sub-sequence of a sequence of random computer data starting at a first offset position of the sequence of random computer data. Using the example of FIG. 1 of FIG. 1, this can comprise random blob reader component 110A creating a sub-blob from a blob, and starting reading from the blob at a random offset position within the blob.

In some examples, operation 604 can comprise generating, by a generator component, the sequence of random computer data with a random size. That is, continuing with the example of FIG. 1, random blob generation component 108 can generate the sequence that random blob reader component 110A reads from.

In some examples, the random size is greater than a defined minimum size and smaller than a defined maximum size. In some examples, the defined minimum size and the defined maximum size are determined based on user input data indicative of the defined minimum size and the defined maximum size. That is, input parameters of max-blob and min-blob can be used to define possible sizes for the sequence of random computer data.

After operation 604, process flow 600 moves to operation 606.

Operation 606 depicts reading, by a second reader component, a second sub-sequence of the sequence of random computer data starting at a second offset position of the sequence of random computer data, wherein the first offset position differs from the second offset position. Continuing with the example of FIG. 1, this can comprise random blob reader component 110B performing a similar operation as random blob reader component 110A in operation 604. In some examples, the two random blob reader components can read from the same sequence. In some examples, the two random blob reader components can read from the different sequences.

After operation 606, process flow 600 moves to operation 608.

Operation 608 depicts storing the first sub-sequence as a first binary large object. Continuing with the example of FIG. 1, this can comprise random blob reader component 110A using the sub-sequence that it read to store it as a data object, to facilitate creating data objects of random data.

After operation 608, process flow 600 moves to operation 610.

Operation 610 depicts storing the second sub-sequence as a second binary large object. Continuing with the example of FIG. 1, this can comprise random blob reader component 110B performing a similar function as comprise random blob reader component 110A does in operation 608.

After operation 610, process flow 600 moves to 612, where process flow 600 ends.

Figure 7:
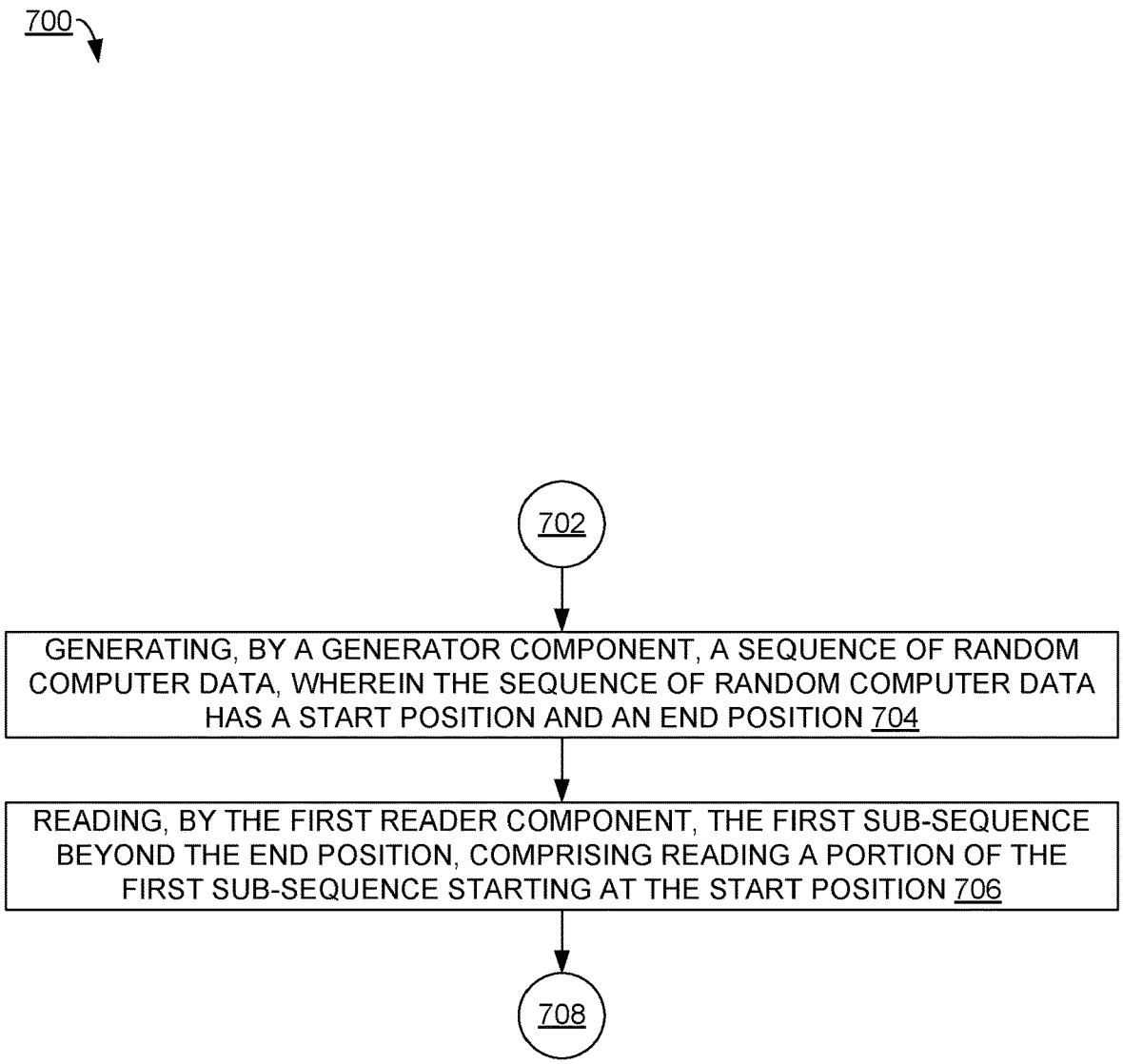
FIG. 7 illustrates another example process flow that can facilitate random blob generation, in accordance with an embodiment of this disclosure.

FIG. 7 illustrates another example process flow that can facilitate random blob generation, in accordance with an embodiment of this disclosure. In some examples, one or more embodiments of process flow 700 can be implemented by random blob generation component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts generating, by a generator component, a sequence of random computer data, wherein the sequence of random computer data has a start position and an end position. The sequence of random computer data can be formed as a bit-ring, such as described with respect to FIG. 2. While the sequence can be stored linearly, such that there is a start position and an end position to the sequence, it can be logically treated as a bit-ring, using modulo arithmetic, such that a reader component is presented with data (from the start of the sequence) when the reader attempts to read past the end of the sequence.

After operation 704, process flow 700 moves to operation 706.

Operation 706 depicts reading, by the first reader component, the first sub-sequence beyond the end position, comprising reading a portion of the first sub-sequence starting at the start position. That is, in some examples, if a reader component attempts to read past the end of the sequence, the reader component can be provided with data from the start of the sequence, such that there is always more data for the reader component to read.

After operation 706, process flow 700 moves to 708, where process flow 700 ends.

Figure 8:
FIG. 8 illustrates another example process flow that can facilitate random blob generation, in accordance with an embodiment of this disclosure.

FIG. 8 illustrates another example process flow that can facilitate random blob generation, in accordance with an embodiment of this disclosure. In some examples, one or more embodiments of process flow 800 can be implemented by random blob generation component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts generating, by a generator component, a first sequence of random computer data. Using the example of FIG. 1, this can comprise random blob generation component 108 generating a sequence of random computer data.

After operation 804, process flow 800 moves to operation 806.

Operation 806 depicts generating, by the generator component, a second sequence of random computer data, wherein the first reader component and the second reader component are configured to read sub-sequences from the second sequence of random computer data. Continuing with the example of FIG. 1, this can comprise random blob generation component 108 generating another sequence of random computer data, as compared to operation 804. That is, a random blob generation component 108 can create multiple sequences, and readers can read from one or more of these sequences.

In some examples, a first size of the first sequence of random computer data differs from a second size of the second sequence of random computer data. That is, random blob generation component 108 can create sequences of different sizes.

In some examples, generating the second sequence of random computer data is performed a random amount of time after generating the first sequence of random computer data. That is, random blob generation component 108 can wait a random amount of time between creating sequences.

In some examples, the random amount of time is greater than a defined minimum amount of time and smaller than a defined maximum amount of time. In some examples, the defined minimum amount of time and the defined maximum amount of time are determined based on user input data indicative of the defined minimum amount of time and the defined maximum amount of time. That is, max-refresh and min-refresh parameters can be specified for sequence generation.

After operation 806, process flow 800 moves to 808, where process flow 800 ends.

FIG. 9 illustrates another example process flow that can facilitate random blob generation, in accordance with an embodiment of this disclosure. In some examples, one or more embodiments of process flow 900 can be implemented by random blob generation component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts reading, by a first reader, a first sub-sequence of a sequence of random computer data starting at a first offset position of the sequence. In some examples, operation 904 can be implemented in a similar manner as operation 604 of FIG. 6.

In some examples, the sequence of random computer data is generated by a generator component of the system that is separate from the first reader and the second reader. That is, the generator component can be similar to random blob generation component 108 of FIG. 1.

After operation 904, process flow 900 moves to operation 906.

Operation 906 depicts reading, by a second reader, a second sub-sequence of the sequence starting at a second offset position of the sequence, wherein the first offset position differs from the second offset position. In some examples, operation 906 can be implemented in a similar manner as operation 606 of FIG. 6.

In some examples, the sequence has a start position and an end position, and operation 904 comprises determining the first offset position based on a random value between the start position and the end position. In some examples, the random value is a first random value, and operation 904 comprises determining the second offset position based on a second random value between the start position and the end position, wherein the first random value differs from the second random value. That is, readers can create random sub-sequences by randomly reading from the sequence starting at random offsets.

After operation 906, process flow 900 moves to operation 908.

Operation 908 depicts storing the first sub-sequence as a first binary large object. In some examples, operation 908 can be implemented in a similar manner as operation 608 of FIG. 6.

After operation 908, process flow 900 moves to operation 910.

Operation 910 depicts storing the second sub-sequence as a second binary large object. In some examples, operation 910 can be implemented in a similar manner as operation 610 of FIG. 6.

After operation 910, process flow 900 moves to 912, where process flow 900 ends.

Figure 10:
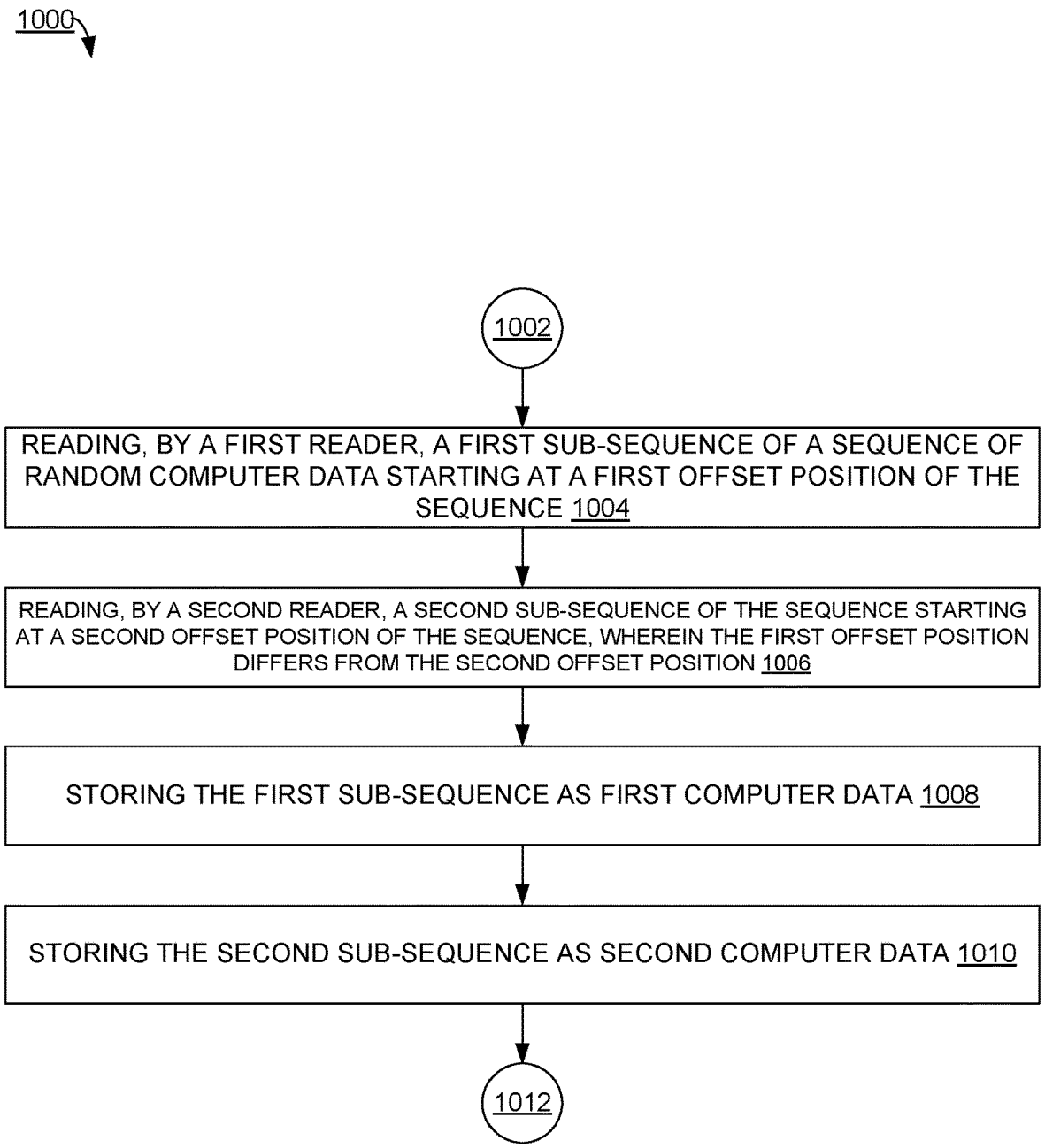
FIG. 10 illustrates another example process flow that can facilitate random blob generation, in accordance with an embodiment of this disclosure.

FIG. 10 illustrates another example process flow that can facilitate random blob generation, in accordance with an embodiment of this disclosure. In some examples, one or more embodiments of process flow 1000 can be implemented by random blob generation component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts reading, by a first reader, a first sub-sequence of a sequence of random computer data starting at a first offset position of the sequence. In some examples, operation 1004 can be implemented in a similar manner as operation 604 of FIG. 6.

After operation 1004, process flow 1000 moves to operation 1006.

Operation 1006 depicts reading, by a second reader, a second sub-sequence of the sequence starting at a second offset position of the sequence, wherein the first offset position differs from the second offset position. In some examples, operation 1006 can be implemented in a similar manner as operation 606 of FIG. 6.

In some examples, a generator component is configured to write the sequence of random computer data to a shared list, the first reader is configured to read the first sub-sequence from the shared list, and the second reader is configured to read the second sub-sequence from the shared list.

In some examples, the first reader is configured to possess a read lock to the shared list concurrently with reading from the shared list. In some examples, the first reader is configured to possess a shared lock to the shared list concurrently with reading from the shared list.

That is, in some examples, to ensure that the readers can access the shared list safely, a mutual exclusion lock can be used that is provided by a multiprocessing module. This lock can ensure that only one process can modify the shared list at a time, which can prevent conflicts between the generator and reader components.

In some example, a reader component takes a read-lock or a shared-lock. It can be that multiple readers can read concurrently. In some examples, the generator component can operate without a lock to write a sequence, as it can be that reader components will only switch to using the new writer data once its complete. This can allow the new random data be generated concurrently while reader components access the old random data.

After operation 1006, process flow 1000 moves to operation 1008.

Operation 1008 depicts storing the first sub-sequence as first computer data. In some examples, operation 1008 can be implemented in a similar manner as operation 608 of FIG. 6. In some examples, the first computer data comprises a group of binary computer data stored as a single logical entity. That is, the first computer data can comprise a blob, or binary large object.

After operation 1008, process flow 1000 moves to operation 1010.

Operation 1010 depicts storing the second sub-sequence as second computer data. In some examples, operation 1010 can be implemented in a similar manner as operation 610 of FIG. 6.

In some examples, operation 1010 comprises reading, by the first reader, a third sub-sequence of the sequence of random computer data starting at a third offset position of the sequence, and storing the third sub-sequence as third computer data. That is, it can be that the same reader component can access a sequence multiple times to create multiple sub-sequences.

After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer 102 of FIG. 1.

In some examples, computing environment 1100 can implement one or more embodiments of the process flows of FIGS. 3-10 to facilitate random blob generation.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the processor, comprising instructions that, in response to execution by the at least one processor, cause the system to perform operations, comprising:
   generating, by a generator component, a sequence of random computer data, wherein the sequence of random computer data has a start position and an end position, and wherein the sequence of random computer data comprises a bit-ring that comprises a logically circular string of data;
   reading, by a first reader component, a first sub-sequence of a sequence of random computer data starting at a first offset position of the sequence of random computer data, wherein reading the first sub-sequence beyond the end position comprises reading a portion of the first sub-sequence starting at the start position;
   reading, by a second reader component, a second sub-sequence of the sequence of random computer data starting at a second offset position of the sequence of random computer data, wherein the first offset position differs from the second offset position, and wherein reading the second sub-sequence beyond the end position comprises reading the portion of the first sub-sequence starting at the start position;
   storing the first sub-sequence as a first binary large object; and
   storing the second sub-sequence as a second binary large object.

2. The system of claim 1, wherein the operations further comprise:
   generating, by the generator component, the sequence of random computer data with a random size.

3. The system of claim 2, wherein the random size is greater than a defined minimum size and smaller than a defined maximum size.

4. The system of claim 3, wherein the defined minimum size and the defined maximum size are determined based on user input data indicative of the defined minimum size and the defined maximum size.

5. The system of claim 1, wherein the sequence of random computer data is a first sequence of random computer data, and wherein the operations further comprise:
   generating, by the generator component, the first sequence of random computer data; and
   generating, by the generator component, a second sequence of random computer data, wherein the first reader component and the second reader component are configured to read sub-sequences from the second sequence of random computer data.

6. The system of claim 5, wherein a first size of the first sequence of random computer data differs from a second size of the second sequence of random computer data.

7. The system of claim 5, wherein generating the second sequence of random computer data is performed a random amount of time after generating the first sequence of random computer data.

8. The system of claim 7, wherein the random amount of time is greater than a defined minimum amount of time and smaller than a defined maximum amount of time.

9. The system of claim 8, wherein the defined minimum amount of time and the defined maximum amount of time are determined based on user input data indicative of the defined minimum amount of time and the defined maximum amount of time.

10. A method, comprising:
 generating, by a generator component of a system comprising at least one processor, a sequence of random computer data, wherein the sequence of random computer data has a start position and an end position, and wherein the sequence of random computer data comprises a bit-ring that comprises a logically circular string of data;
 reading, by a first reader component of the system a first sub-sequence of the sequence of random computer data starting at a first offset position of the sequence, wherein reading the first sub-sequence beyond the end position comprises reading a portion of the first sub-sequence starting at the start position;
 reading, by a second reader component of the system, a second sub-sequence of the sequence of random computer data starting at a second offset position of the sequence of random computer data, wherein the first offset position differs from the second offset position, and wherein reading the second sub-sequence beyond the end position comprises reading the portion of the first sub-sequence starting at the start position;
 storing, by the system, the first sub-sequence as a first binary large object; and
 storing, by the system, the second sub-sequence as a second binary large object.

11. The method of claim 10, wherein the generator component is separate from the first reader component and the second reader component.

12. The method of claim 10, further comprising:
 determining, by the system, the first offset position based on a random value between the start position and the end position.

13. The method of claim 10, wherein the random value is a first random value, and further comprising:
 determining, by the system, the second offset position based on a second random value between the start position and the end position, wherein the first random value differs from the second random value.

14. A non-transitory computer-readable medium comprising instructions that, in response to execution, cause a system comprising at least one processor to perform operations, comprising:
 generating, by a generator, a sequence of random computer data, wherein the sequence of random computer data has a start position and an end position, and wherein the sequence of random computer data comprises a bit-ring that comprises a logically circular string of data;
 reading, by a first reader, a first sub-sequence of the sequence of random computer data starting at a first offset position of the sequence of random computer data, wherein reading the first sub-sequence beyond the end position comprises reading a portion of the first sub-sequence starting at the start position;
 reading, by a second reader, a second sub-sequence of the sequence of random computer data starting at a second offset position of the sequence of random computer data, wherein the first offset position differs from the second offset position, and wherein reading the second sub-sequence beyond the end position comprises reading the portion of the first sub-sequence starting at the start position;
 storing the first sub-sequence as a first binary large object; and
 storing the second sub-sequence as a second binary large object.

15. The non-transitory computer-readable medium of claim 14, wherein the generator is configured to write the sequence of random computer data to a shared list, wherein the first reader is configured to read the first sub-sequence from the shared list, and wherein the second reader is configured to read the second sub-sequence from the shared list.

16. The non-transitory computer-readable medium of claim 15, wherein the first reader is configured to possess a read lock to the shared list concurrently with reading from the shared list.

17. The non-transitory computer-readable medium of claim 15, wherein the first reader is configured to possess a shared lock to the shared list concurrently with reading from the shared list.

18. The non-transitory computer-readable medium of claim 14, wherein the operations further comprise:
 reading, by the first reader, a third sub-sequence of the sequence of random computer data starting at a third offset position of the sequence;
 storing the third sub-sequence as third computer data.

19. The non-transitory computer-readable medium of claim 14, wherein the operations further comprise:
 determining the first offset position of the sequence as a bitwise AND operation of a first offset value and one less than a number of bits of the sequence.

20. The non-transitory computer-readable medium of claim 14, wherein the sequence of random computer data is a first sequence of random computer data, and wherein the operations further comprise:
 generating, by the generator, a second sequence of random computer data, wherein the first reader and the second reader are configured to read sub-sequences from the second sequence of random computer data.

* * * * *